United States Patent
Ovelman

[11] Patent Number: 5,927,681
[45] Date of Patent: Jul. 27, 1999

[54] FENCE AND WALL MOUNT FOR CAMERA TRIPOD

[76] Inventor: Robert M. Ovelman, 715 Malin Rd., Newton Square, Pa. 19073

[21] Appl. No.: 08/956,043

[22] Filed: Oct. 24, 1997

[51] Int. Cl.$^6$ .................................................. G03B 17/00
[52] U.S. Cl. ....................... 248/682; 248/177.1; 248/214; 248/691; 396/428
[58] Field of Search .................................... 248/167, 214, 248/215, 682, 690, 691, 692, 176.1, 177.1; 396/419, 428

[56] References Cited

U.S. PATENT DOCUMENTS

| | | | |
|---|---|---|---|
| 3,146,984 | 9/1964 | Matthews | 396/428 X |
| 3,433,443 | 3/1969 | Mangan et al. | 248/214 |
| 3,993,088 | 11/1976 | Thomas | 248/167 X |
| 4,289,393 | 9/1981 | Kawazoe | 396/428 |
| 4,615,597 | 10/1986 | Burriss | 396/428 |
| 4,944,434 | 7/1990 | Hamilton | 248/214 X |
| 5,009,380 | 4/1991 | Fee | 248/214 |
| 5,055,864 | 10/1991 | Slikkers | 396/428 |
| 5,260,731 | 11/1993 | Baker, Jr. | 396/428 |
| 5,538,212 | 7/1996 | Kennedy | 396/428 X |

*Primary Examiner*—Derek J. Berger
*Attorney, Agent, or Firm*—Lorusso & Loud

[57] ABSTRACT

A support bracket or camera tripod mount serves to support a camera tripod by attachment to a center post of the tripod and to allow the tripod with camera attached to be hung from a vertical structure such as a fence. The support bracket includes a crosspiece member which is approximately horizontal in use, first leg portions extending in parallel, perpendicular to the cross-piece member to first elbows. Intermediate leg portions are connected to each of the first elbows which may rotate relative to the first leg portions. Distal leg portions extend in parallel to the first leg portions and are fixed to ends of the intermediate leg portions through second elbows. A set screw fitting is provided in each of the first elbows for locking the intermediate leg and distal leg portions against rotation. A connecting member extends perpendicular from the cross-piece member to a post bracket for attachment to the center post of a camera tripod.

4 Claims, 3 Drawing Sheets

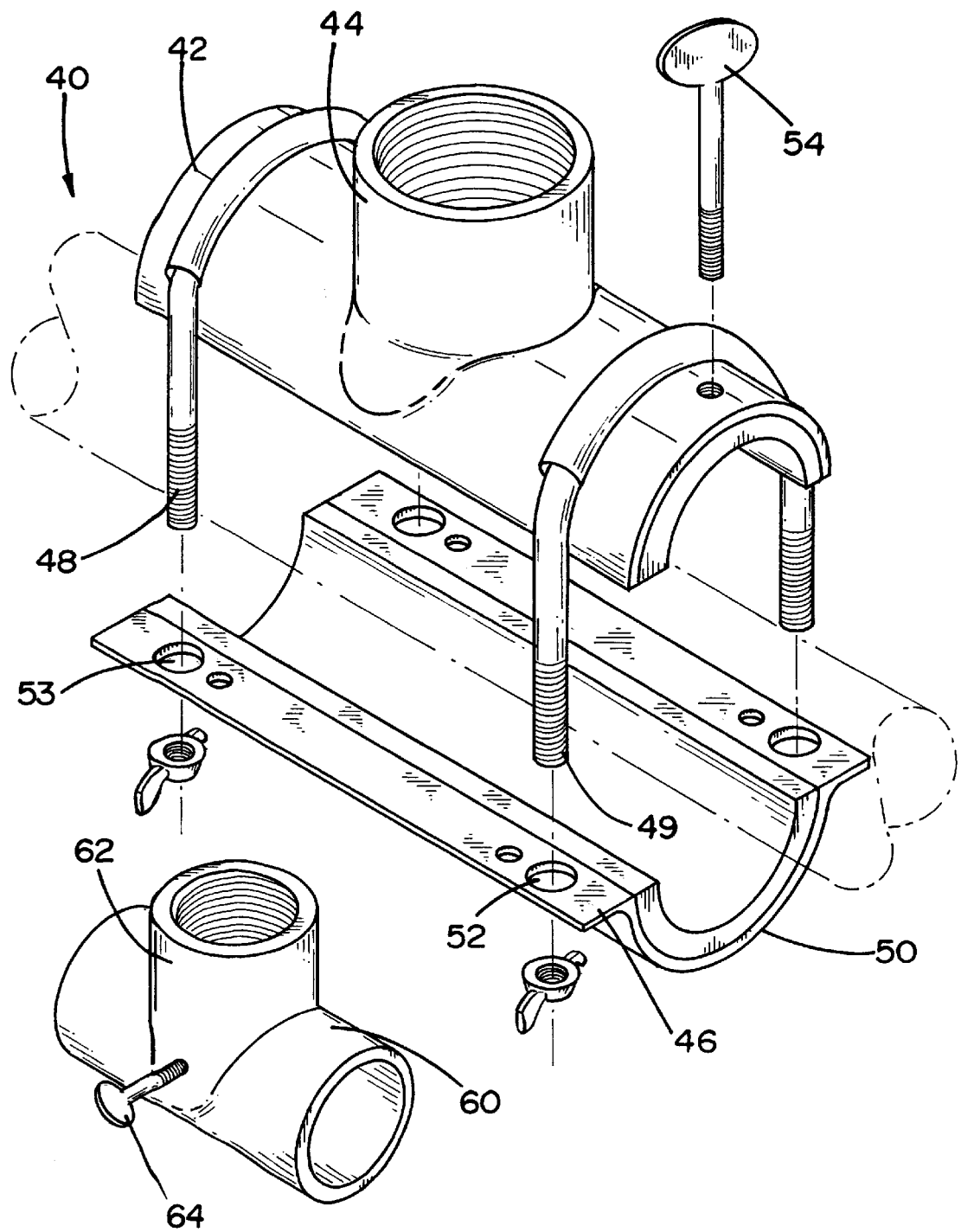

FENCE AND WALL MOUNT FOR CAMERA TRIPOD

FIELD OF THE INVENTION

The present invention relates to a mount for hanging a tripod, with camera attached, from a fence, wall or door.

THE PRIOR ART

Conventional tripods have been traditionally used in the filming of sporting events. They provide a steady support allowing filming of an unblurred picture as well as vertical adjustment, pivotal adjustment and horizontal rotation. However, in certain sporting events, tennis for example, an unobstructed view of the playing field is often difficult to obtain. Placement near the sideline often poses a danger to both the camera and the players and may be prohibited by game officials. To overcome the above-described problems hangers and hanging platforms have been developed to allow the camera, or camera and tripod, to be hung from a round bar of the type which forms the top of a typical chain link fence. Such mounts are designed for the tall chain link fences which often enclose a tennis court. One such mount is disclosed in Kennedy patent U.S. Pat. No. 5,538,212 which includes a pair of hooks of a fixed shape designed to mate with the top of the steel bar of a conventional chain link fence. Because of the fixed shape and orientation of the hooks, this mount is not easily adaptable to use of other structures, walls, curtains, cables, etc., for support. The device is designed of a substitute for a tripod and, while it includes an adjustable post, it does not include a geared, mechanical vertical adjustment as does a conventional tripod.

Most of the prior art mounts designed to hang from a fence are somewhat flimsy.

SUMMARY OF THE INVENTION

In view of the above-described deficiencies of prior art camera support brackets, the present invention provides a camera tripod mount (hereinafter "support bracket") including parallel arm members which pivot toward each other to clamp a vertical support structure between the two parallel arm members and the legs or center post of a camera tripod or unipod attached thereto.

More specifically, the present invention provides a support bracket for supporting a camera tripod by securing the central support post of the camera tripod to a vertical structure such as a fence. The support bracket includes a cross-piece member which defines a central axis, approximately horizontal in use, and a pair of leg members attached to opposite ends of the cross-piece member. Each of the leg members includes a first leg portion fixed to one end of the cross-piece member and extending perpendicular from the central axis to a first elbow. Thus, the two first leg portions extend from opposite ends of the crosspiece member and are parallel to each other. The first elbows are attached to the ends of the first leg portions opposite the cross-piece member and provide a connection for intermediate leg portions which are rotatable about the axes of the first leg portions. Each intermediate leg portion is connected at the first elbow to a first leg portion and extends therefrom to a second elbow where it is connected to a distal leg portion. The distal leg portions extend from the second elbows in parallel with each other and in parallel with the first leg portions. A connecting member is fixed to a central portion of the crosspiece member and extends to a bracket which can be clamped onto a camera tripod post.

In a preferred embodiment, each of the first elbows is rotatable on its joining first leg portion and is provided with a screw fitting for locking the intermediate leg portions against rotation once the distal leg portions are pivoted into position against the supporting vertical structure. Alternatively, the first leg portions may be rotatably attached to the opposite ends of the cross-piece member through connector elbows provided with a set screw for locking against rotation.

In use, the attachment means is fitted onto a camera support post, e.g. the center post of a camera tripod, with the bracket leg members extending away from the camera, approximately parallel to the tripod central post. The support bracket is then placed over a vertical support structure, such as a fence or curtain, with the connecting member resting on the top of the fence and the fence extending between the distal leg portions and the central post of the tripod or between the distal leg portions and legs of the tripod or unipod. The distal leg portions are then pivoted inward, tightly against the fence and locked there by means of the screw or friction fittings. In this manner, the camera itself is supported in a position above the top of the fence for a clear, unobstructed field of view.

Thus, the support bracket of the present invention has adjustable legs which swivel forward or backward and can be locked into place against the fence or other vertical support with a set screw or other locking device. The purpose for the adjustable feature of the support bracket legs is to allow for differing widths of the vertical structure, e.g. fence, by which the bracket is supported. The vertical support will typically be the top pipe of a chain link fence such as used to enclose outdoor playing fields, e.g. tennis courts or baseball backstops. Likewise, the vertical support may be a steel cable of the type typically used to support a curtain for an indoor tennis court.

The support bracket of the present invention offers a number of advantages over the prior art including:

The support bracket allows for hanging a tripod from the top of a fence without use of a ladder. A ladder is unnecessary because the length of the tripod legs allow the user to lift the bracket over a fence;

The support bracket is universal in the sense that it can be hung over any type of vertical support, i.e. round, square rectangular or irregular shape, and of any dimension.

The support bracket may be rotated 180° about the axis defined by the connecting member to allow the tripod to be hung from a support point above its head. One example of such a use would be a baseball backstop. In this configuration, the camera could be located behind the fence to protect it, whereas the configuration shown in FIG. 2 may be suitably used in connection with a tennis court enclosure where the camera is not so susceptible to damage upon being struck by a ball or other object.

While the camera tripod support bracket of the present invention is described as used supported by a conventional sporting field enclosure, other uses will be readily apparent to those skilled in the art, e.g. as a support for security and surveillance cameras, etc.

BRIEF DESCRIPTION OF THE DRAWINGS

In the drawings:

FIG. 3 is an exploded perspective view of a camera support attachment which may be used to attach the support bracket of FIG. 1 to the center post of a camera tripod; and FIG. 4 is a perspective view of a tee bracket for attachment to the support post of a camera tripod free of attached tripod legs.

DESCRIPTION OF THE PREFERRED EMBODIMENTS

Figure 1:
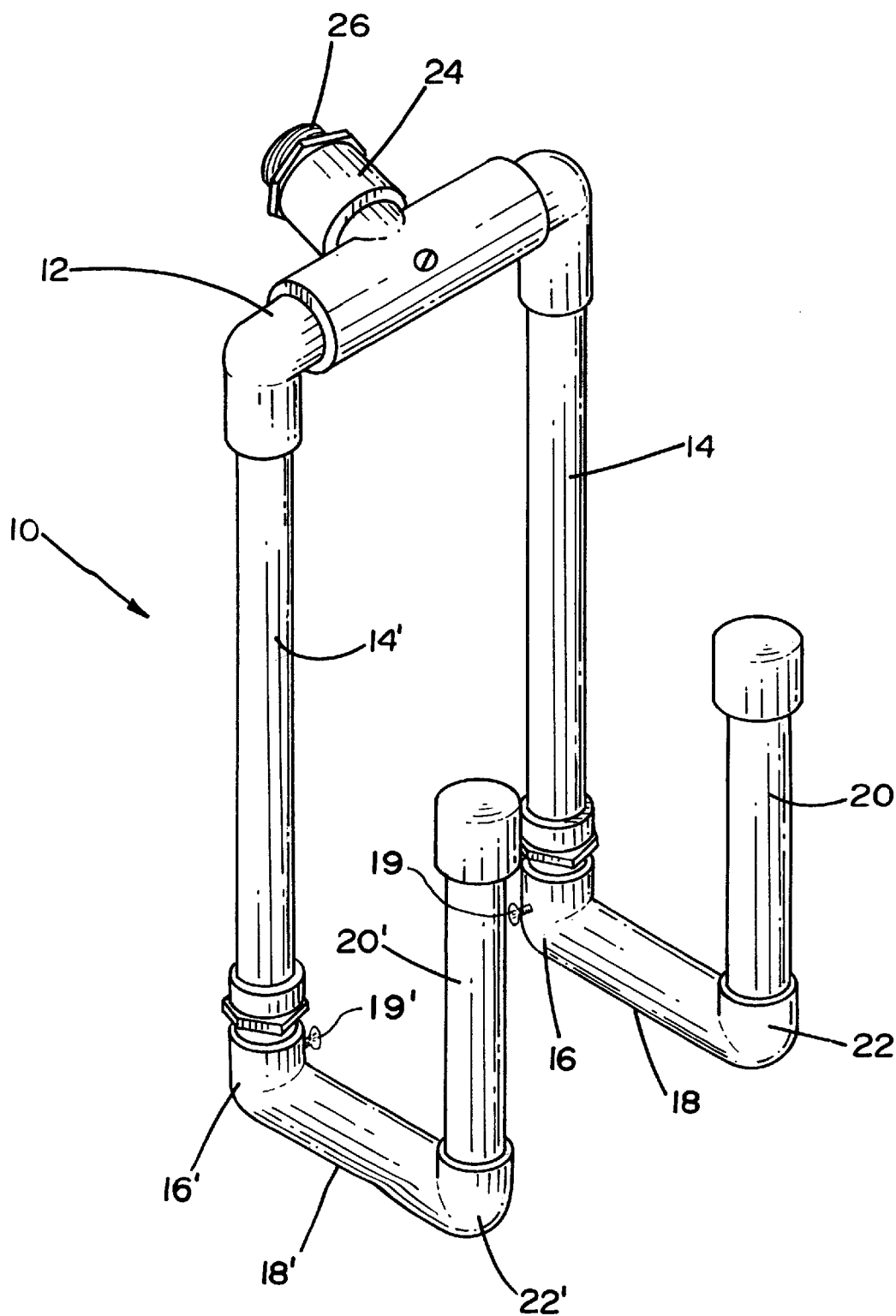
FIG. 1 is a perspective view of the camera support bracket of the present invention without the camera support post attachment.

As shown in FIG. 1 the support bracket of the present invention, generally designated 10, includes a cross-piece member 12 having first leg portions 14, 14' fixed to opposite ends thereof and extending perpendicular thereto. Elbows 16, 16' are connected to the ends of the first leg portions 14, 14' opposite the cross-piece member 12. Elbows 16, 16' form rotatable connections for rotation of intermediate leg portions 18, 18' about the central axes of first leg portions 14, 14'. Set screws 19, 19', threaded into mating holes in, respectively, elbows 16 and 16', when tightened, serve to lock elbows 16, 16' against rotation relative to first leg portions 1, 14'. Distal leg portions 20, 20' are connected to the intermediate leg portions at elbows 22, 22'.

A nipple 24 with a threaded fitting 26 extends perpendicular from approximately the center of the cross-piece member 12. The threaded fitting 26 which extends from the nipple portion 24 is adapted to mate with one of the post attachment fittings shown in FIGS. 3 and 4.

All components of the support brackets shown in FIG. 1, inclusive of the elbows and leg portions, are suitably fabricated out of commercially available rigid plastic pipe and fittings, e.g. PVC. PVC pipe 1 inch in diameter possesses sufficient rigidity for proper support of a camera with tripod attached.

The support bracket of FIG. 1 is intended to attach to a standard tripod to allow the camera to be elevated above the top of the fence by using the elevating screw associated with the tripod head. In this manner, the camera can be elevated 1–2 feet above the top of the vertical support structure as needed. Conventional tripods include a type having a center post which is independent of the legs and another type in which the legs are supported from, i.e. braced from, the center posts on supports which slide up and down the posts. The post attachment depicted in FIG. 3 may be used with the former type whereas the post attachment (split bracket) depicted in FIG. 2 may be used with either type. The post attachment, once fixed to the center post of the camera tripod, can be left attached to the tripod with the support bracket of the present invention removed and not in use. The post attachment does not interfere with folding the tripod or with any of the other functions provided by the tripod in normal use. For use, the threaded nipple of the connection member is screwed into the post attachment.

Figure 2:
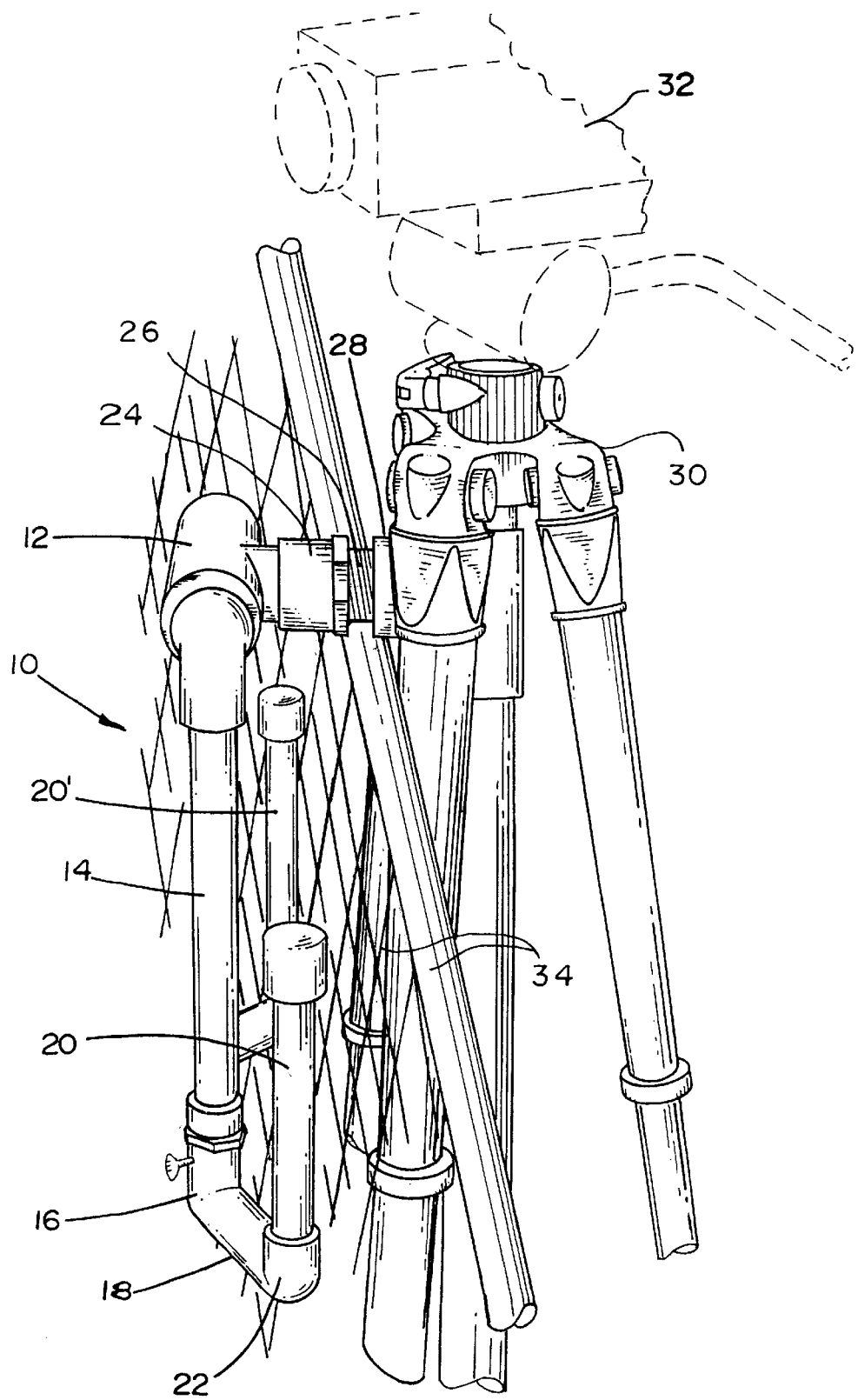
FIG. 2 is a perspective view of the support bracket of FIG. 1 attached to the center post of a camera tripod and hooked over the top of a fence for support.

FIG. 2 shows the support bracket 10 of the present invention supporting a conventional tripod 30 and camera 32 on the top of a chain link fence 34. Connecting member 34 or its associated threaded nipple 26 may be brought to rest on the top of the fence or other vertical support. Supported in this manner, the camera and tripod will not rock or otherwise move relative to the fence because they are locked in place by the force of distal leg portions 20, 20' bearing against the fence. In actual use, the fence will be pinched between the distal leg portions 20, 20' and one or more legs or center post of the camera tripod.

FIG. 3 shows a split tee post attachment for mounting on the 20 post of the camera tripod. The post attachment 40 includes a first portion 42 having a threaded socket 44 for receiving the threaded nipple 26 of connecting member 24 shown in FIGS. 1 and 2. To place the post attachment on the tripod center post, first portion 42 is placed on one side of the post and a second portion 46 is placed on an opposing side of the post with U-bolts 48, 49 received in and extending through holes 52 and 53. Portions 42 and 46 are then fixed together by the tightening of wing nuts (not shown) on the U-bolts 48 and 49. The concave surfaces of first and second portions 42, 46 each have a rubber lining 50. The fitting may be further tightened on the tripod center post by tightening screw 54.

FIG. 4 shows an alternative embodiment for use on a tripod center post of the type to which the tripod legs are not attached. The embodiment of FIG. 4 is a tee connection 60 of single piece construction. As in the embodiment of FIG. 3 tee number 60 includes a female threaded socket 62 for receiving the threaded nipple 26 of connecting member 24 of the support bracket 10. A thumb screw 64 is provided for tightening the tee member 60 on the tripod center post.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A support bracket for supporting a camera tripod, by attachment to a center post of the tripod, to allow the tripod with camera attached to be hung from a vertical structure, said support bracket comprising:

a cross-piece member defining a central axis which is adapted to be approximately horizontal when supporting the camera;

a pair of leg members fixed to opposite ends of said cross-piece member, said leg members including first leg portions extending in parallel, perpendicular from said central axis, to first elbows, each of said first leg portions defining a leg axis, an intermediate leg portion connected to each of said first elbows for rotation about said leg axis and a distal leg portion extending parallel to each first leg portion and fixed to a second elbow mounted on an end of each intermediate leg portion opposite said first elbow;

rotation means for rotating said intermediate leg and distal leg portions about said longitudinal axes;

locking means for locking said intermediate leg portions against rotation about said leg axes; and a connecting member, fixed to said cross-piece member at a central portion thereof, and including a post bracket for attachment to the tripod center post, whereby said connecting member can be placed resting on the top of a vertical support structure to bear the weight of the support bracket with camera and camera tripod attached.

2. A support bracket in accordance with claim 1 wherein said rotation means is provided in said first elbows whereby said first elbows rotate relative to said first leg portions.

3. A support bracket in accordance with claim 1 wherein said locking means comprises a threaded hole formed in each of said first elbows and a screw mating with said threaded hole.

4. A support bracket according to claim 1 wherein said post bracket is a split tee member including clamping means for attachment to the tripod center post and a threaded member for attachment to a mating threaded member fixed to said connecting member.

* * * * *